United States Patent Office 3,116,280
Patented Dec. 31, 1963

3,116,280
ACID MONOAZO DYESTUFFS
Franz Frisch, Porza, Tessin, and Carl Ryffel, Dornach, Solothurn, Switzerland, assignors to Sandoz Ltd. (also known as Sandoz A.G.), Basel, Switzerland
No Drawing. Filed Jan. 16, 1961, Ser. No. 82,686
Claims priority, application Switzerland Jan. 22, 1960
3 Claims. (Cl. 260—199)

This invention relates to acid monoazo dyestuffs of the formula

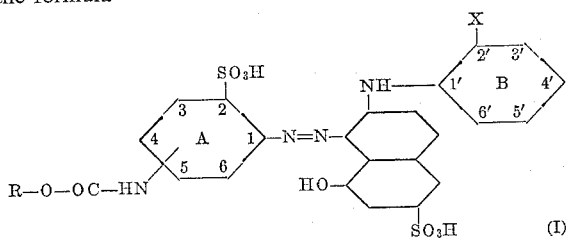

wherein R represents a hydrocarbon radical which (a) is bound to the carbon atom of the carbonyl group through an oxygen atom, (b) contains at least 5 carbon atoms and (c) may be substituted, X represents a low molecular alkyl radical, and wherein the radical R—O—OC—HN— stands in 4- or 5-position, and the nucleus A and/or the nucleus B may contain further substituents.

The process for the production of these new monoazo dyestuffs consists in (a) coupling in acid medium 1 mol of the diazo compound of a 1-aminobenzene-2-sulfonic acid of the formula

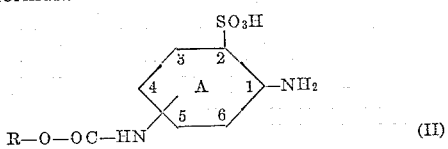

wherein R represents a hydrocarbon radical which is bound to the carbon atom of the carbonyl group through an oxygen atom and contains at least 5 carbon atoms and may be substituted, wherein the radical R—O—OC—HN— stands in 4- or 5-position and the nucleus A may contain further substituents, with 1 mol of an azo component of the formula

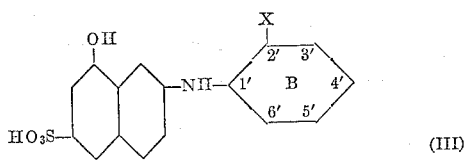

wherein X has the forecited meaning and the nucleus B may contain further substituents, or (b) reacting a monoazo dyestuff of the formula

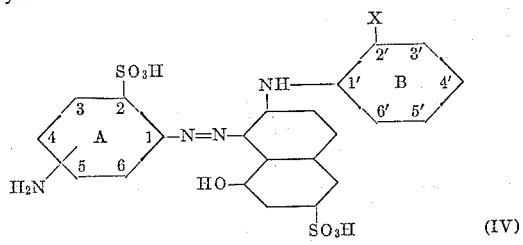

wherein X, A and B have the aforecited meanings and the $NH_2$ group stands in 4- or 5-position, with a functional derivative of an acid of the formula $$R—O—COOH \quad (V)$$

wherein R has the aforecited meaning.

The new acid monoazo dyestuffs dye wool, silk, leather and synthetic polyamide fibers from neutral to weakly acid baths in bright, bluish-red shades which have very good fastness to light and wet treatments, especially to washing, perspiration, acid, alkali and alkaline milling.

The compounds of Formula II can be produced from the corresponding diaminobenzenesulfonic acid by monoacylation or from the corresponding aminonitrobenzenesulfonic acid by acylation and subsequent reduction, for example from 2,4-diaminobenzene-1-sulfonic acid, 2,5-diaminobenzene-1-sulfonic acid, 2,4-diamino-5-methylbenzene-1-sulfonic acid, 2,4-diamino-5-chlorobenzene-1-sulfonic acid, 2-nitro-4-aminobenzene-1-sulfonic acid.

It is possible to arrive at the dyestuff of Formula IV, for example, by diazotising a corresponding aminonitrobenzenesulfonic acid, coupling in acid medium with a compound of Formula III and reducing the nitro group to the amino group, or by diazotising a 4- or 5-acylamino-1-aminobenzene-2-sulfonic acid and coupling in acid medium with a compound of Formula III with subsequent saponification. Suitable starting products for this purposes are e.g. 4-nitro-6-methyl-1-aminobenzene-2-sulfonic acid, 4-chloro-5-nitro-1-aminobenzene-6-sulfonic acid, 4-acetyl- or 4-formylamino—1-aminobenzene-2-sulfonic acid, 1-amino-3-propionylamino-4-ethylbenzene-6-sulfonic acid.

For the reaction of the aminomonoazo compound of Formula IV according to the present invention to give the dyestuff of Formula I, excellent acylating agents are the chloroformic acid esters of aliphatic and aromatic alcohols which may be further substituted, such as amyl, hexyl, octyl, decyl, lauryl, cetyl, benzyl and cyclohexyl alcohols, and the chloroformic acid ester of the 4-octyl- and 4-cyclohexyl-1-hydroxybenzene.

As azo components of Formula III according to the invention, the following are suitable: 2-(2',4'-dimethyl)-phenylamino-, 2-(2',5'-dimethyl)-phenylamino-, 2-(2',6'-dimethyl)-phenylamino-, 2 - (2',4',6'-trimethyl)-phenylamino-, 2-(2'-methyl)-phenylamino-, 2-(2'-methyl-4',6'-dichloro)-phenylamino-, 2 - (2',6' - dimethyl-4'-chloro)-phenylamino-, 2-(2'-methyl-5'-chloro)-phenylamino-, 2-(2'-ethyl)-phenylamino- or 2-(2'-ethyl-5'-chloro)-phenylamino-8-hydroxynaphthalene-6-sulfonic acid.

The starting materials of Formula II used in the present invention are preferably diazotised indirectly.

Thanks to the high energy of coupling of the diazo compounds employed, the combination of the components proceeds fairly rapidly in the presence of mineral acid and in each case in 1-position to the azo component. The coupling reaction can, of course, be accelerated when the mineral acid is practically neutralised by the careful, gradual addition of an acid-binding agent, e.g. sodium acetate. The monoazo dyestuffs formed, which are often well crystallized, are filtered off, if necessary by the addition of common salt, and dried.

As a rule, the introduction of the acyl radical is accomplished by dissolving the dyestuff to be acylated in aqueous medium, if desired with the addition of an organic solvent such as acetone or dioxane, and adding the acylating agent at a low or increased temperature, if necessary in the presence of an acid-binding agent such as sodium hydroxide solution, sodium carbonate, sodium bicarbonate, calcium hydroxide, calcium carbonate or pyridine, which at the same time can act as a catalyst.

In the following examples the parts and the percentages are by weight and the temperatures in degrees centigrade.

EXAMPLE 1

59.8 parts of the monoazo dyestuff obtained by the acid coupling of 23 parts of diazotized 1-amino-4-acetylamino-benzene-2-sulfonic acid with 35.7 parts of 2-(2',4',6'-trimethyl) - phenyl-amino-8-hydroxynaphthalene-6-sulfonic acid are dissolved in the form of the disodium salt in a warm solution of 1000 parts of water and 1000 parts of alcohol. After the addition of 50 parts of 30% hydrochloric acid, the solution is maintained at 95° for 3 hours in order to split off the acetyl group of the monoazo dyestuff. The hydrolized dyestuff is completely precipitated; it is filtered off cold and then dissolved in 2000 parts of water with the addition of 10 parts of sodium carbonate. 25 parts of chloroformic acid lauryl ester are added dropwise to the solution at 50° in the course of several hours according to the rate of consumption. During acylation 10 parts of sodium bicarbonate are strewn into the reaction mass in small portions so that a constant pH value of 7.5–8 is maintained. The dyestuff thus formed is completely precipitated, and, after the reaction mass has cooled, it is filtered off with suction and dried. The new monoazo dyestuff is a dark red powder which dyes wool, silk and synthetic polyamide fibers from a neutral to weakly acetic acid bath in full ruby shades of very good light fastness and excellent wet fastness.

Similar dyestuffs are obtained when the 25 parts of chloroformic acid lauryl ester are replaced by an equivalent amount of chloroformic acid octyl ester or chloroformic acid cetyl ester.

In the following table are listed further monoazo dyestuffs which can be obtained according to the particulars given in Example 1. They correspond to the formula

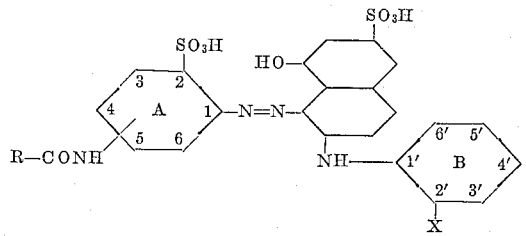

The meanings of R, X and the substituents of the nuclei A and B are given in the column headings.

Table A

| Example No. | Meaning of the substituents in nucleus B | | | | | Meaning of R in the radical R—OC—HN in 4- or 5- position of nucleus A | | Shade of the dyeing on wool |
|---|---|---|---|---|---|---|---|---|
| | X | 3' | 4' | 5' | 6' | in 4-position | in 5-position | |
| 2 | CH₃ | H | CH₃ | H | CH₃ | CH₃(CH₂)₇—O— | | blue-red. |
| 3 | CH₃ | H | CH₃ | H | CH₃ | CH₃(CH₂)₉—O— | | Do. |
| 4 | CH₃ | H | CH₃ | H | CH₃ | CH₃(CH₂)₁₅—O— | | Do. |
| 5 | CH₃ | H | H | H | H | CH₃(CH₂)₉—O— | | Do. |
| 6 | CH₃ | H | CH₃ | H | H | CH₃(CH₂)₉—O— | | Do. |
| 7 | CH₃ | H | H | CH₃ | H | CH₃(CH₂)₁₁—O— | | Do. |
| 8 | CH₃ | H | H | H | CH₃ | CH₃(CH₂)₇—O— | | Do. |
| 9 | CH₃ | H | H | H | CH₃ | CH₃(CH₂)₁₅—O— | | Do. |
| 10 | CH₃ | H | CH₃ | H | CH₃ | | CH₃(CH₂)₇—O— | Do. |
| 11 | CH₃ | H | CH₃ | H | CH₃ | | CH₃(CH₂)₁₁—O— | Do. |
| 12 | CH₃ | H | CH₃ | H | CH₃ | | CH₃(CH₂)₁₅—O— | Do. |
| 13 | C₂H₅ | H | H | H | H | CH₃(CH₂)₉—O— | | Do. |
| 14 | CH₃ | H | H | H | H | CH₃(CH₂)₄—O— | | Do. |
| 15 | CH₃ | H | H | H | H | CH₃(CH₂)₅—O— | | Do. |
| 16 | CH₃ | H | H | H | H | CH₃(CH₂)₆—O— | | Do. |
| 17 | CH₃ | H | H | H | H | CH₃(CH₂)₈—O— | | Do. |
| 18 | CH₃ | H | H | H | H | CH₃(CH₂)₁₇—O— | | Do. |
| 19 | CH₃ | H | CH₃ | H | CH₃ | | CH₃(CH₂)₈—O— | Do. |
| 20 | C₂H₅ | H | H | H | H | | CH₃(CH₂)₁₇—O— | Do. |
| 21 | CH₃ | H | CH₃ | H | CH₃ | Cl—C₆H₂Cl₂—CH₂—O— | | Do. |
| 22 | CH₃ | H | CH₃ | H | CH₃ | C₆H₅—CH₂—O— | | Do. |
| 23 | CH₃ | H | CH₃ | H | CH₃ | Cl—C₆H₄—CH₂—O— | | Do. |

Table B

| Example No. | Meaning of the substituents in nucleus B | | | | | Meaning of the substituents e.g. the radical R in the radical R—OC—HN- in 4- position of nucleus A | | | Shade of the dyeing on wool |
|---|---|---|---|---|---|---|---|---|---|
| | X | 3' | 4' | 5' | 6' | in 4-position | 5- | 6- | |
| 24 | CH₃ | H | H | H | H | CH₃(CH₂)₈—O— | H | CH₃ | blue-red. |
| 25 | CH₃ | H | H | H | H | CH₃(CH₂)₉—O— | C₂H₅ | H | Do. |
| 26 | CH₃ | H | H | H | H | CH₃(CH₂)₁₀—O— | Cl | H | Do. |
| 27 | CH₃ | H | H | H | H | CH₃(CH₂)₁₁—O— | H | Cl | Do. |
| 28 | CH₃ | H | H | H | H | CH₃(CH₂)₁₂—O— | CH₃ | H | Do. |
| | | | | | | Meaning of the substituents e.g. the radical R—OC—HN- in 5-position of nucleus A | | | |
| | | | | | | in 5-position | 4- | 6- | |
| 29 | CH₃ | H | H | H | H | CH₃(CH₂)₁₂—O— | Cl | H | Do. |
| 30 | CH₃ | H | H | H | H | CH₃(CH₂)₁₂—O— | CH₃ | H | Do. |
| 31 | CH₃ | H | H | H | H | CH₃(CH₂)₁₂—O— | H | Cl | Do. |

Formulae of the representative dyestuffs of the foregoing examples are as follows:

EXAMPLE 3

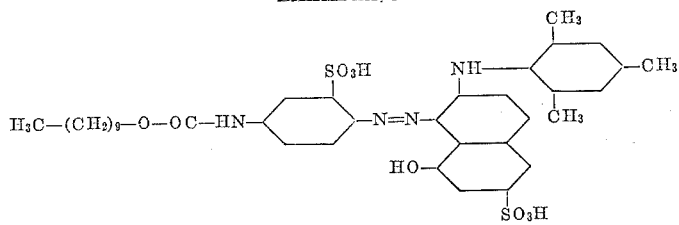

EXAMPLE 6

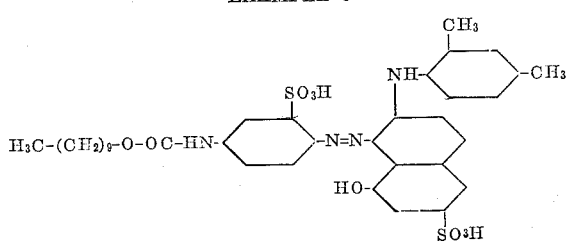

Having thus disclosed the invention what we claim is:
1. Acid monoazo dye of the formula

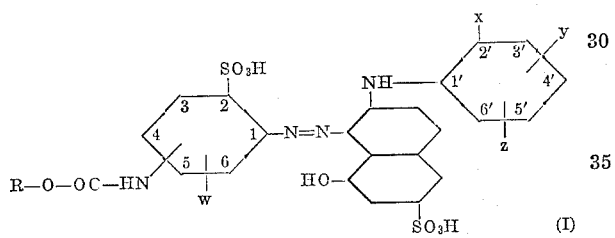

wherein
  R is a member selected from the group consisting of alkyl containing from 5 to 18 carbon atoms, benzyl, monochlorobenzyl and trichlorobenzyl,
  w is a member selected from the group consisting of hydrogen, methyl, ethyl and chlorine,
  x is a lower alkyl
each of
  y and z is a member selected from the group consisting of hydrogen and methyl, wherein
  w stands in one of the positions 4, 5 and 6,
each of
  y and z stands in one of the position 4', 5' and 6' and the radical R—O—OC—HN— stands in one of the positions 4 and 5.
2. The acid monoazo dyestuff which corresponds to the formula

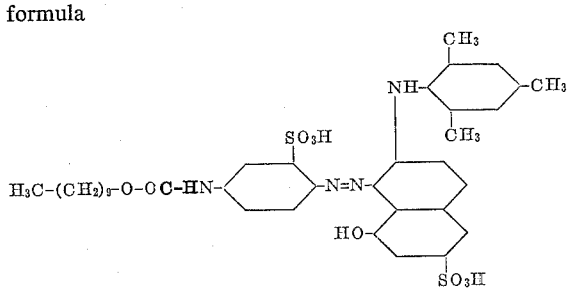

3. The acid monoazo dyestuff which corresponds to the formula

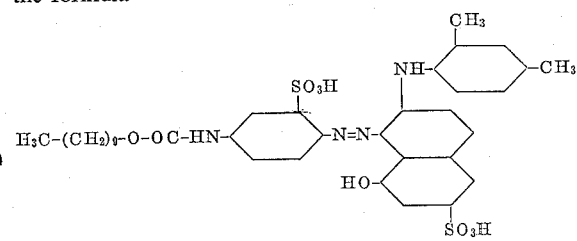

References Cited in the file of this patent
UNITED STATES PATENTS

| | | |
|---|---|---|
| 2,373,693 | Knight et al. | Apr. 17, 1945 |
| 2,904,543 | Kappeler et al. | Sept. 15, 1959 |